Aug. 7, 1923.  
H. B. CRANAGE  
1,464,030  
IRONING MACHINE FOR PRESSING SEAMS OF CLOTHING  
Filed Sept. 8, 1920  5 Sheets-Sheet 1
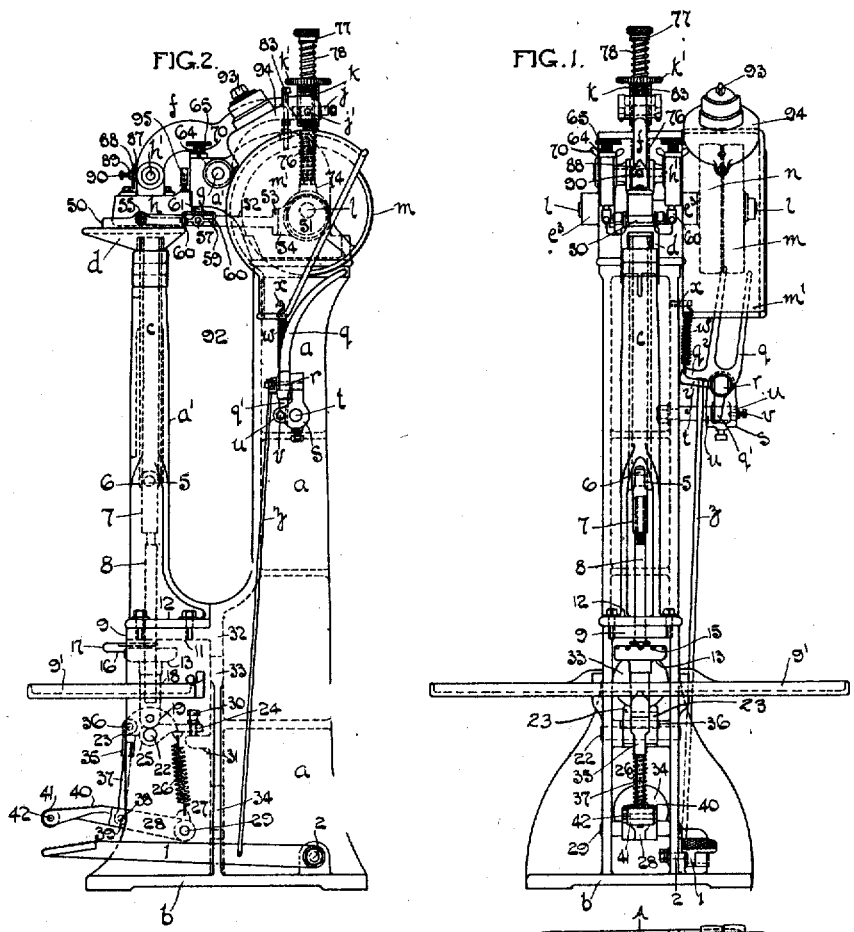
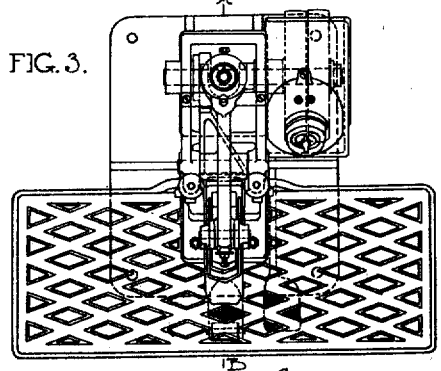

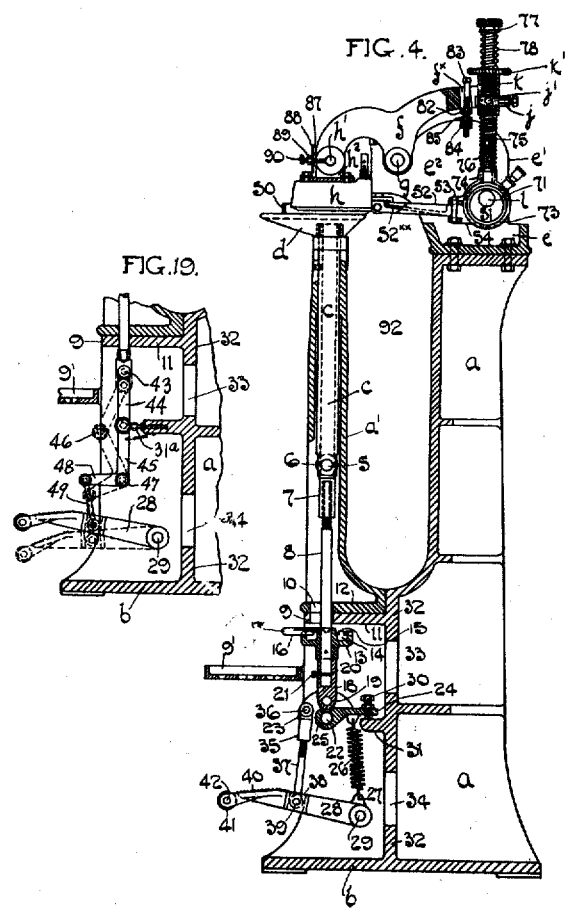

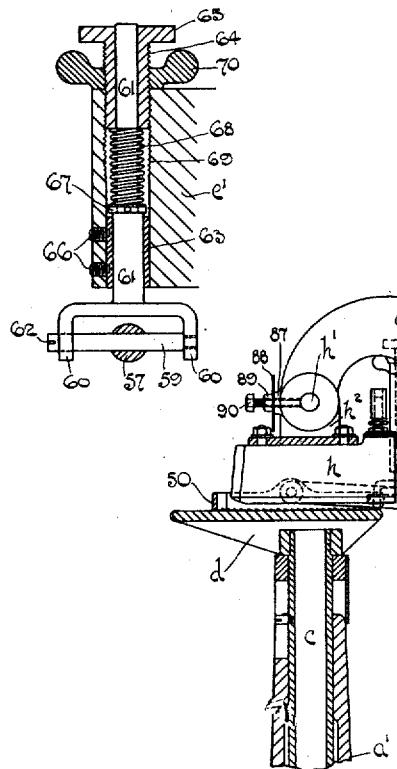
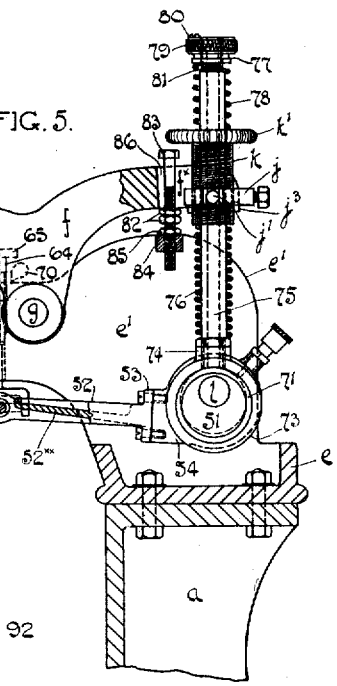
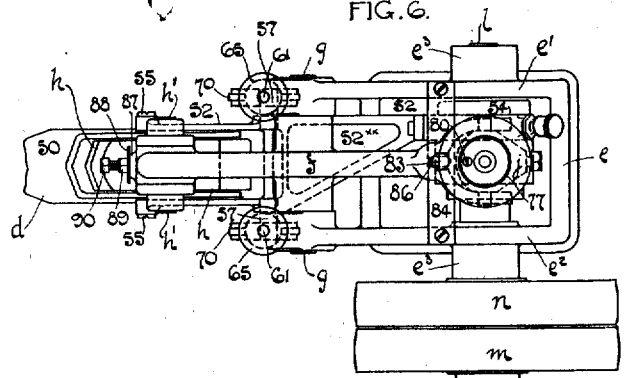

Aug. 7, 1923.
H. B. CRANAGE
1,464,030
IRONING MACHINE FOR PRESSING SEAMS OF CLOTHING
Filed Sept. 8, 1920     5 Sheets-Sheet 4
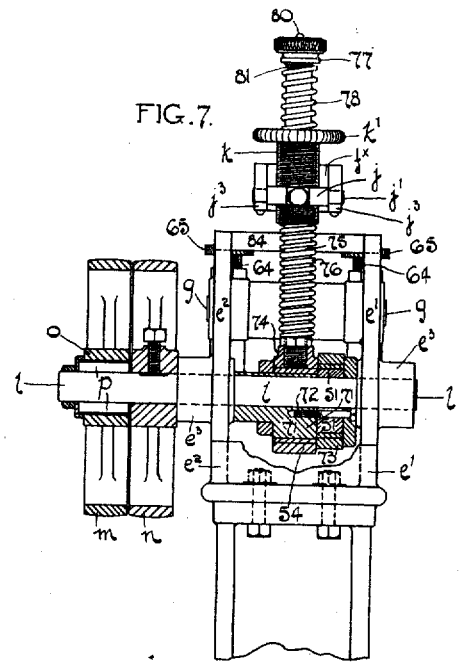
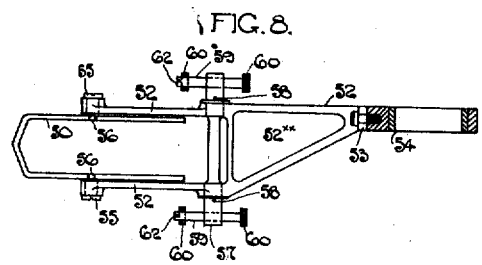
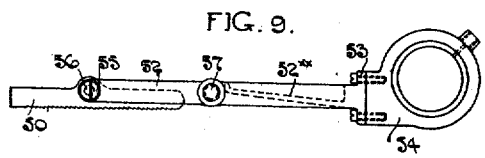

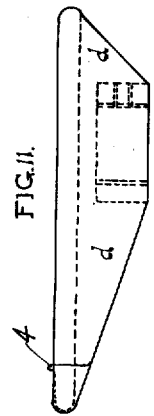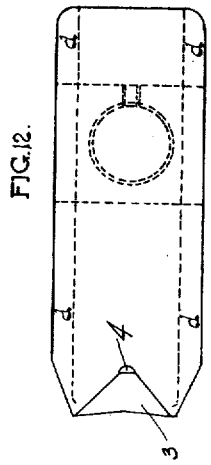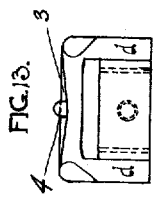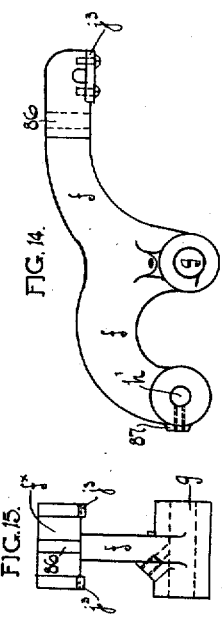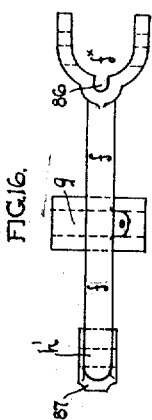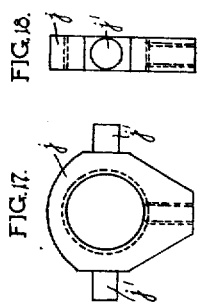

Patented Aug. 7, 1923.

1,464,030

UNITED STATES PATENT OFFICE.

HARRY BENSON CRANAGE, OF LEEDS, ENGLAND, ASSIGNOR OF FOUR-TENTHS TO LOUIS FOX, OF LEEDS, ENGLAND.

IRONING MACHINE FOR PRESSING SEAMS OF CLOTHING.

Application filed September 8, 1920. Serial No. 408,990.

*To all whom it may concern:*

Be it known that I, HARRY BENSON CRANAGE, of 20 Vicarage Avenue, Kirkstall Lane, Kirkstall, Leeds, in the county of York, England, engineer, have invented new and useful Improvements in or Relating to Ironing Machines for Pressing Seams of Clothing; of which the following is a specification.

This invention relates to that type of ironing machine used for pressing seams in clothing and kindred trades in which the seam is first opened and afterwards pressed, and it is particularly applicable to the machines described in Letters Patent, No. 1,356,044, granted October 19, 1920.

In the said patent means are described for raising and lowering the hollow work support for the insertion and withdrawal of the garment operated upon, and means are also described for regulating the pressure to be imparted on the heated iron, and for feeding the work under the pressing iron. In practice good results have been obtained from the just named arrangements of the said parts.

The object of the present invention is to simplify the machine and at the same time increase its efficiency by dispensing with the seam opening portion of the feeding device, and by arranging for the seam to be opened as the work passes over its support and to be fed forward whilst the pressing iron has been raised or is rising out of its working position. The work support in this invention is raised, lowered, and retained in its working position by an arrangement of toggle levers operated by a treadle.

In the drawings hereunto annexed is shown means for carrying the invention into practice, in which—

Fig. 1 is a front elevation of a pressing machine constructed according to this invention;

Fig. 2 a side elevation of the same;

Fig. 3 a plan of Fig. 1;

Fig. 4 a part sectional elevation on line A, B, Fig. 3;

Fig. 5 an enlarged part side and part sectional elevation of the upper portion of the machine;

Fig. 6 a plan of Fig. 5;

Fig. 7 is a front elevation of parts shown in Fig. 5;

Fig. 8 an enlarged plan of the feed lever and feeding device;

Fig. 9 an elevation of Fig. 8 certain of the supporting parts being omitted;

Fig. 10 an enlarged part sectional elevation of the adjustable device for carrying the feed lever;

Fig. 11 an enlarged elevation of the work support showing the recess therein for the passage of the seam;

Fig. 12 a plan of Fig. 11;

Fig. 13 an end elevation of Fig. 11;

Fig. 14 an enlarged elevation of the double ended lever;

Fig. 15 an end elevation of the same;

Fig. 16 a plan of Fig. 14;

Fig. 17 an enlarged elevation of the oscillating ring;

Fig. 18 an end elevation of the same;

Fig. 19 a part sectional elevation of the lower portion of the framework of the machine and the toggle arrangement.

Like parts are marked with similar letters of reference.

$a$ is the standard of the machine and $b$ its base. In the embodiment of the invention illustrated the arm $a^1$ of the bifurcated portion of the standard is made separate from the main portion $a$. $c$ is a spindle working in the arm $a^1$ and having the work support $d$ fixed upon its upper end. To the top of the main portion of the standard $a$ is mounted the head $e$ of the machine having two vertical sides or cheeks $e^1$, $e^2$ projecting from the base or lower portion of the head $e$. $f$ is a double ended lever mounted upon the spindle $g$. To the front end of lever $f$ is jointed at $h^1$ the gas or electrically heated pressing iron $h$. The opposite end of the lever $f$ is bifurcated at $f^x$ to receive an oscillating ring $j$ provided with trunnions $j^1$, $j^1$ which work in vertical slots formed in the arms of the bifurcation $f^x$ and are retained in their working position by caps or plates $j^2$, $j^2$ (Figs. 5, 7, 14) secured to said arms by screws. In the oscillating ring $j$ is a central screw threaded hole in which is mounted the screw threaded nut $k$ to be presently more fully described. $l$ is the driving shaft carried by the bosses $e^3$, $e^3$ in which are provided, when required, any form of ball or anti-frictional bearings. On the driving shaft are respectively mounted the loose pulley $m$ and the fast pulley $n$. The boss $o$ of the loose pulley $m$ is provided with roller or other anti-frictional bearings $p$. $q$ is a belt fork mounted upon a stud or pivot $r$ mounted in a bracket $s$ carried by stud $t$ fixed to the framework $a$. The belt fork $q$ is provided with two projections $q^1$, $q^2$ for purposes to be described. The pendant projection $q^1$ is arranged to oscillate between two lugs $u$ formed on the bracket $s$. In the lugs $u$ are respectively mounted the set screws $v$,—provided with lock nuts,—which act as stops for adjusting and regulating the movement of the projection $q^1$ and consequently of the belt itself. The second lug $q^2$ projects at or about a right angle from the lower portion of one of the sides of the belt fork $q$, and the lug has attached thereto a spring $w$ the upper end of the latter being connected to a pin $x$ fixed to the standard $a$. On one side of the lug $q^2$ is formed a projection $y$ in which is a hole through which the connecting rod $z$,—having an enlarged tapering or other head,—passes. The lower end of the rod $z$ is attached to treadle 1 pivoted at 2 to the framework $a$. $m^1$ is a protection cover for the pulleys $m$, $n$ and belt not shown.

The work support $d$ is so shaped as to permit of a V-shaped recess 3 being formed therein for the passage of the seam to and under the pressing iron $h$. In some cases, when required,—but not necessarily so,—a protuberance 4 is formed at the inner end of the V-shaped recess and when such protuberance or swelling 4 is employed it performs the function of a seam opener. The V-shaped recess 3,—shown in plan at Fig. 12,— is also inclined from its inner end to the outer portion of the work support $d$, as shown at Fig. 11. During the passage of the seam through the said recess to and under the pressing iron when the protuberance or swelling 4 is dispensed with, then the operator, in some classes of goods, may have to assist in opening the seam with his or her finger, but in other cases the seam can be opened by passing through the V-shaped recess only. This permits of the dispensing with any special provision for seam opening being made on the feeding device on its outward movement.

In machines constructed according to this invention the work support is raised, lowered, and retained in its working position by the following means:—

The lower end of the rod $c$ is bifurcated and at 5 is jointed the end or tongue 6 of the socket 7. In the socket 7 is formed a central hole having an internal screw thread. The rod or spindle 8 has formed at its upper end a screw thread adapted to engage with the internal screw thread of the socket 7. The rod 8 is arranged to pass through the openings or slits 9 and 10 formed in the flanges or projections 11 and 12 respectively of the framework $a$ and the arm $a^1$. The lower end of the rod or spindle 8 is either made plain or has a screw thread formed thereon, as at Fig. 19.

In the arrangement shown at Figs. 1 and 4 the rod or spindle 8 is provided with a plain end and to it is fixed by a pin or other convenient means a wheel 13 at a suitable distance below the flange or projection 11. The wheel 13 is shown recessed at 14 and the upper edges of the recessed portion of the wheel have formed therein a number of notches 15 with which the projection 16 formed on, or fixed to, a hand lever is made to engage when it is required to turn the wheel for adjusting the position of the work support $d$.

In some cases instead of using the herein described arrangement an ordinary hand wheel may be employed for the same purpose.

The end of the spindle or rod 8 is prolonged beyond the boss of the wheel 13 and fits into a socket 18 provided with a bifurcated end 19 by which the rod is connected to the toggle arrangement. In the end of the rod or spindle 8, which passes into the central hole of socket 18, is formed a groove 20 into which is passed the end of a set screw 21 (see Fig. 4). The set screw and groove are provided for retaining the end of the rod in position but yet at the same time permitting of it being rotated as required for adjusting purposes.

By means of the adjustments herein described the work support $d$ may be adjusted to the varying thicknesses of the seams being operated upon.

On a spindle 22 is mounted either a disc or a curved plate 23 which forms part of the toggle arrangement. The toggle arrangement shown at Figs. 1, 2 and 4 consists of a central lever portion 24, the boss part 25 of which is mounted upon the spindle 22. A pair of curved plates 23 are cast on, or fixed to, the central portion 24,—as shown in the said figures,—and the lower end of the socket 18 is passed between the two curved plates 23 and secured in working position by the pin 19. The lower end of the socket 18 is curved and a portion of the upper surface of the central part 24 is cut away to permit of its working freely. To the underside of the central portion 24 is formed or fixed a lug to which the upper end of a coiled spring 26 is attached. The lower end of the said spring is attached to a lug 27 formed upon the upper surface of the treadle 28 which is pivoted upon a spindle 29 carried by the framework $a$. In the free end of the central portion 24 is provided a hole through which an adjusting screw 30 is arranged to pass and its outer end forms a stop which is arranged to come in contact with a projection or stop 31 formed on the web 32 of the framework $a$. The web 32 is perforated at 33 and 34 so as to form a means of getting to the set screw for adjusting purposes and to the treadle 28 and spindle 29.

Between the outer ends of the curved plates 23 is passed the upper end of a socket 35 which is mounted upon the pin 36. In the socket is formed a central hole provided with an internal screw thread with which the screw threaded upper end of a connecting rod 37 is engaged. The lower end of the said rod is provided with an enlarged portion that passes into the recess 38 of the treadle 28 and is secured in its working position by a pin 39. The outer end of the treadle is roughened at 40 and also bifurcated for the reception of a roller 41 mounted upon pin 42 carried by the arms of the said bifurcations. This roller is provided so as to reduce the friction in the working of the treadle.

By the above described arrangement for adjusting the work support $d$ all the advantages of toggle levers are obtained, or the arrangement of the wheel 13, socket 18, curved plates 23, and spring 26 may be replaced by the combination of levers shown at Fig. 19, in which the lower end of the said rod is connected to a pin 43 to which one end of a pair of toggle levers 44, 45 are connected. The two toggle levers 44 and 45 are connected together by pin 46 and the lower end of toggle lever 45 is fixed to a spindle 47 upon which a lever 48 is also mounted and fixed. The outer end of lever 48 is connected to the treadle 28 by the connecting rod 49.

In this arrangement the position of the stop $31^a$ is adjusted and varied in length to suit the toggle levers so that when they are brought to their central position the inner end of levers 44 and 45 will abut against the said stop.

To feed the seam to and under the pressing iron $h$ the frame 50 is employed and it is of a similar construction to that described in Patent No. 1,356,044 hereinbefore mentioned except that its pointed ends are dispensed with for seam opening purposes, and in this instance the frame 50 is used for gripping and aiding the feeding of the seam as it travels forwards and under the pressing iron $h$ when the latter is in a raised position. On the return motion of the frame 50 it is raised clear of the garment and its seam.

To impart the requisite intermittent reciprocating motion to the frame 50 motion is obtained from an eccentric 51 mounted upon the driving shaft $l$ and the said frame is connected by a second bifurcated frame,—hereinafter termed the feed bracket 52,—which is connected at its flanged end 53 to the eccentric strap 54. A well is formed in the rear portion of the bracket 52 by a web $52^{xx}$ for receiving any oil that may drop from the working parts of the machine and for preventing it passing on to the work as it otherwise would be liable to do.

The bracket 52 is joined to the frame 50 by the set screws 55, the inner ends of which pass into the protuberance 56 of the frame 50. Through the feed bracket 52 is passed a rod or bar 57 and all lateral movement thereof is prevented by the pins 58. Through and at a suitable distance from each end of the rod or bar 57 are passed at right angles thereto, rods or spindles 59. One end of each spindle 59 is reduced in diameter and has a screw thread formed thereon adapted to enter a hole in one of the arms 60 of the bifurcated end of rod 61. The other portion of the spindle 59 passes through, and projects beyond, the other arm of the said bifurcated end, and is provided with a groove 62 for turning purposes. The rod 61 (see Fig. 10) is formed of two diameters, the upper portion being smaller than the lower part which is connected to the bifurcated end and the two portions are respectively carried in the bushes 63 and 64, the latter being provided with a suitable projecting flange 65 for turning purposes. The bush 63 is prevented from rotating by means of the grub screws 66.

On the lower and reduced portion of the spindle 61 is fixed, by any convenient means, a washer 67 and between the upper surface of the said washer and the bottom of the bush 64 is inserted a coiled spring 68 which is mounted upon the reduced portion of spindle or rod 61. The bush 64 is screw threaded on its periphery and is made to engage with the screw threaded portion of the hole 69. In order to lock the bush 64 in position after the tension of the spring has been suitably adjusted, a wing nut 70 is provided. By this means the pressure to be imparted to the feed frame 50 may be adjusted as required.

It will readily be understood that the rods or spindles 59, bifurcated end of rod 61, spring 68, bushes 63 and 64 and lock nuts 70 are provided in duplicate and that the central portion of the feed bracket 52 is suspended by the spindle 59 and rods 61.

The required reciprocating motion is imparted to the feed frame 50 and bracket 52 from the eccentric 51 through its strap.

To impart the required pressure to the heated iron $h$ for pressing the seams, on the driving shaft $l$ is mounted and fixed a second eccentric 71. The eccentrics 51 and 71 are connected together by the screw threaded pin 72 and when required by an additional set screw which secures the said eccentric to the shaft. For ease in running and reducing the friction, any convenient arrangement of ball or roller bearings may be interposed between the periphery of the eccentrics and the inner periphery of the straps. The strap 73 of the eccentric 71 is provided with a boss 74. Into this boss 74 is screwed the end of a tube or rod 75 which passes through the screw threaded nut $k$ which is carried by the oscillating ring $j$. The nut $k$ is provided with a milled or other flange $k^1$ for adjusting purposes. Between the boss 74 and the lower end of the screw threaded nut $k$ is inserted a spring 76 and above the milled or other flange $k^1$ of the said nut and between it and a nut 77 is inserted a second spring 78. The nut 77 is provided with a milled head and with a horizontal slot 79 through which is passed the set screw 80 for locking the nut on to a screw thread 81 which is cut or otherwise formed on the upper end of the rod or tube 75 (see Fig. 7). The spring 76 is employed for increasing or diminishing the pressure to be applied to the heated iron $h$, the said pressure being adjusted by means of the milled headed nut $k$. The second spring 78 is employed for pressing the lever $f^1$ against the adjustable stop 82 (Figs. 4 and 5) and also for aiding and regulating the time of the machine.

The adjustable stop 82 consists of a pair of nuts mounted upon a bolt 83 which is screwed into a cross bar 84 which is fixed to, or forms part of, the head of the machine and passes between the two cheeks or uprights $e^1$, $e^2$. On the bolt 83 is provided a lock nut 85 which retains the bolt in the required position. By altering the position of the nuts 82 on the bolt 83 the movement of the double ended lever $f$ is controlled. The bolt 83 is arranged to pass through the recess 86 in the bifurcated end of lever $f$. On the free end of the lever $f$ is provided a boss 87 against which a stop plate 88 is placed and retained in position by a lock nut 89 mounted upon a set screw 90. The set screw 90 is also employed for retaining the pin $h^1$ which passes through the free end of lever $f$ and lug $k^2$, to which the heated iron is fixed, in position. The stop plate 88 is employed for keeping the front portion of the heated iron $h$ in a level position owing to its rear portion being the heavier.

9' is a tray upon which the work is placed and which keeps the article operated upon from the treadle. The said tray is hinged or otherwise fixed to the framework of the machine.

On the top of the cover $m^1$ is fixed an electrical switch 93 and a resistance box 94 whereby varying heats may be imparted to the iron $h$. 95 are electrical terminals for connecting the wire to the iron $h$ for heating purposes.

Other parts of the machine not described or illustrated may be of a similar description to those described and illustrated in the hereinbefore mentioned specification.

The action of the machine is as follows:—

The work table $d$ is first lowered by treadle 28 acting upon rod 37, curved plates 23, socket 18, rods 8 and $c$ to allow the work to be inserted between the top of the workplate and the heated iron $h$. After this has been done the operator removes the foot from the end of the lever 28 thus allowing the workplate $d$ to return to the position shown in the drawings. The machine is then set in motion by the treadle 1 acting upon the rod $z$ and the belt fork $q$ whereby motion is imparted to the driving shaft $l$, thus imparting, by means of eccentrics 51 and 71, the required intermittent reciprocating motion for actuating the feeder 50 and the double ended lever $f$ and heated iron $h$. The V-shaped recess in the workplate into which the seam is passed keeps the seam central with the iron $h$. The springs 75 and 78 having been adjusted by the nuts $k$ and 77 as previously described, the required intermittent pressure is imparted to the iron for pressing purposes and for raising it clear of the seam to be pressed. The feeding of the said seam under the iron takes place when the iron is raised. After a portion of the seam has been pressed, and when it has reached the rear of the work plate $d$, it passes into recess 92 between the two arms of the framework, or, as in the case of a pair of trousers or a sleeve, after passing over the rear end of the work plate it may pass down the arm $a^1$.

What I claim is:—

1. In a machine for the purpose described, the combination of a frame, a support for the garment to be pressed mounted on the frame, a lever mounted on the frame and having one arm projecting over the garment support and its other arm bifurcated, a heated pressing iron connected with the end of said lever above the garment support, a power shaft, an eccentric mounted on said shaft, a rod connected to said eccentric and extending through the bifurcation in the iron supporting lever, means between said lever and eccentric for determining the pressure applied by the iron to a garment on the support, and an adjustable means within the bifurcation of said lever for controlling said pressure means.

2. In a machine for the purpose described, the combination of a frame, a support for the garment to be pressed mounted on the frame, a lever mounted on the frame and having one arm projecting over the garment support and its other arm bifurcated, a heated pressing iron connected with the end of said lever above the garment support, a power shaft, an eccentric mounted on said shaft, a rod connected to said eccentric and extending through the bifurcation in the iron supporting lever, a ring surrounding said rod within the bifurcation in the iron carrying lever, a member extending through said ring about the rod, and adjustable longitudinally of the latter, and coiled springs surrounding the rod between abutments thereon and the ends of said adjustable member.

3. In a machine for the purpose described, the combination of a bifurcated framework having a driving shaft mounted thereon, a support for the garment to be pressed, a heated iron, a feeding device, a bifurcated frame to which the feeding device is jointed, said frame having an eccentric strap at one end and a transverse spindle passing through the frame between the feeding device and the said strap, a pair of spring controlled bifurcated rods each having a horizontal guide rod mounted thereon upon which the ends of the said spindle reciprocate, means for adjusting the positions of the said bifurcated rods, and for separately tensioning the springs, and an eccentric for operating the feeding device.

4. In a machine for the purpose described, the combination of a bifurcated framework having a driving shaft mounted thereon, means for imparting a rotary motion thereto, a pair of eccentrics fixed upon said shaft, a support for the garment being pressed, a heated iron, means for effecting the relative vertical movement between the support and iron, a feeding device, means for reciprocating the feeding device by one of the said eccentrics, a double ended lever fulcrumed to the framework having the heated iron attached to one end and bifurcated and recessed at the other end, a rod at one end having an eccentric strap attached thereto adapted to engage with the second eccentric, a trunnioned ring mounted in the bifurcated end of the lever, a flanged and screw threaded guide nut for the rod mounted in said ring, a pair of springs mounted respectively upon the rod at each end of the nut, means for separately adjusting the springs, and an adjustable stop pin for regulating the movement of the lever.

5. In a machine for the purpose described, the combination of a frame, a support for the garment to be pressed, an iron arranged above and adapted to cooperate with the support, means for effecting relative vertical movement between the support and iron, a reciprocating feeding device movable transversely of the support for feeding a garment thereover when the support and iron are separated, a member extending upward from the feeding device, and adjustable spring pressed means cooperating with the last said member to control the pressure exerted by the feeding device.

HARRY BENSON CRANAGE.

Witnesses:
W. FAIRBURN-HART,
ALICE M. TURNER.